United States Patent [19]

Scanderbeg

[11] Patent Number: 4,746,093
[45] Date of Patent: May 24, 1988

[54] PILOTED VALVE

[75] Inventor: Georges Scanderbeg, Winterthur, Switzerland

[73] Assignee: Sulzer Brothers Limited, Winterthur, Switzerland

[21] Appl. No.: 103,455

[22] Filed: Oct. 1, 1987

[30] Foreign Application Priority Data

Oct. 1, 1986 [CH] Switzerland .................. 3924/86

[51] Int. Cl.[4] .............................. F16K 31/02
[52] U.S. Cl. .................. 251/30.04; 251/38; 251/282
[58] Field of Search .......... 251/25, 30.02, 30.03, 251/30.04, 38, 39, 44, 129.15, 129.2, 282

[56] References Cited

U.S. PATENT DOCUMENTS

| 747,777 | 11/1903 | Martin | 251/38 |
|---|---|---|---|
| 1,605,380 | 11/1926 | Wagner | 251/38 |
| 1,989,341 | 1/1935 | Shenton | 251/30.04 |
| 2,379,181 | 6/1945 | Pontius, 3rd et al. | 251/30.04 |
| 2,479,359 | 8/1949 | Holt | 251/30.03 |
| 2,575,272 | 11/1951 | Harris | 251/30.04 |
| 2,624,542 | 1/1953 | Ghormley | 251/30.02 |
| 2,968,464 | 1/1961 | Olson | 251/30.04 |
| 4,304,264 | 12/1981 | McClintock et al. | 251/30.04 |
| 4,679,765 | 7/1987 | Kramer et al. | 251/38 |
| 4,699,351 | 10/1987 | Wells | 251/38 |

FOREIGN PATENT DOCUMENTS

| 0195206 | 9/1986 | Fed. Rep. of Germany | 251/38 |
|---|---|---|---|
| 0594386 | 2/1978 | U.S.S.R. | 251/30.04 |

Primary Examiner—George L. Walton
Attorney, Agent, or Firm—Kenyon & Kenyon

[57] ABSTRACT

The piloted valve has three abutment surfaces for controlling the positions of the pilot lid and main lid. The abutment surfaces are disposed relative to each other so that the maximum stroke of the pilot lid relative to the casing is greater than the maximum stroke of the pilot lid relative to the main lid and less than the sum of the maximum stroke of the pilot lid and the maximum stroke of the main lid relative to the casing. With the pilot lid open and the main lid closed, a large flow cross-section is available; however, closing of the pilot lid with the main lid open requires only a very short stroke. The resulting valve operates very rapidly.

10 Claims, 2 Drawing Sheets

PILOTED VALVE

This invention relates to a piloted valve. More particularly, this invention relates to a valve which employs a pilot lid.

As is known, various types of valves have been provided with include a main lid for controlling flow and a pilot lid for controlling the operation of the valve under the influence of a pressure medium flowing through the valve. For example, European Pat. No. 0 195 206 describes a valve with a main lid which is movable within a first pressure chamber so as to close off an outlet and which has a valve chamber therein which communicates via a bore with the pressure chamber as well as a passage which communicates the valve chamber with the outlet. In addition, a pilot lid is disposed in the valve chamber to close off the passage to the outlet. The pilot lid is also connected to a spindle which carries a pair of spaced apart guide members which sub-divide the valve chamber into three sub-chambers which communicate with each other.

Still further, the described valve has an equalizing chamber receiving a distal end of the spindle as well as a second pressure chamber located between the equalizing chamber and the valve. A magnet armature is also mounted on the spindle for sliding within the second pressure chamber. In this case, the equalizing chamber is in continuous communication with the valve chamber and the second pressure chamber is in continuous communication with the first pressure chamber.

This known valve is also provided with a first abutment surface on the main lid for limiting an opening movement of the pilot lid relative to the main lid as well as a second abutment surface on the casing for limiting an opening movement of the main lid relative to the casing.

Generally, a valve of this above kind has opening and closure behavior which are generally satisfactory, particularly because the valve obviates the risk of possible accidental lifting of the pilot lid shortly after the lid has closed. This valve is often used to control safety systems, for example, for vapor generators, in which its main use is as a pilot valve for safety valves. The rapidity of response to a control signal, in terms of fractions of a second, is therefore of vital importance. However, it has been found that there is a limit to the rapidity of response of the known valve, the limit being dependent mainly upon valve dimensions and the pressures which are operative.

Accordingly, it is an object of the invention to speed up the response time of a known valve without any alteration in dimensions and pressure relationships and without impairment of the opening and closing behavior of the valve.

Briefly, the invention provides a valve of generally known construction, for example as described in European Pat. No. 0 195 206, the disclosure of which is hereby incorporated by reference, with a third abutment surface for limiting an opening movement of the pilot lid relative to the casing. In this respect, the three abutment surfaces are disposed relative to each other so that the maximum stroke of the pilot lid relative to the casing is greater than the maximum stroke of the pilot lid relative to the main lid and less than the sum of this latter stroke and the maximum stroke of the main lid relative to the casing.

When the pilot lid is in the closed position, the permanent communication between the first pressure chamber and the second pressure chamber and between the equalizing chamber and the valve chamber helps to optimize the pressure difference acting on the pilot lid, so that the pilot lid experiences an adequate closing force, yet no excessive force is needed to overcome such closing force at opening. Because of the separation between the connections referred to, the volume supplied at a variable pressure when the pilot lid opens and closes is reduced very considerably, thus boosting rapid pressure changes. Consequently, subsequently no pressure differences are operative on the pilot lid outside the closed position thereof. The result of the arrangement of the abutment surfaces is that, With the pilot lid open and the main lid closed, a large flow cross-section is available for reducing the pressure in the valve chamber and in the equalizing chamber, yet closing of the pilot lid with the main lid open requires only a very short stroke. The valve therefore operates more rapidly.

The construction of the valve does not affect the external shape of the valve and does not greatly affect its weight either. Hence, the valve can readily be fitted in existing facilities instead of the known valve. Indeed, existing valves can often be converted at relatively low cost to the valve according to the invention.

Rapidity of action can be further increased by a continuous communication, as by a longitudinally extending cavity in the spindle, between the equalizing chamber and the valve chamber. Also, the weight and therefore the inertia of the pilot lid is reduced without any increase in weight being necessary elsewhere in the valve. Tests have shown that the novel valve can be operated five or six times as fast as the known valve; for example, it can open in approximately 0.1 second as compared with 0.5 to 0.6 second for the known valve.

These and other objects and advantages of the invention will become more apparent from the following detailed description taken in conjunction with the accompanying drawings wherein.

Figure 1:
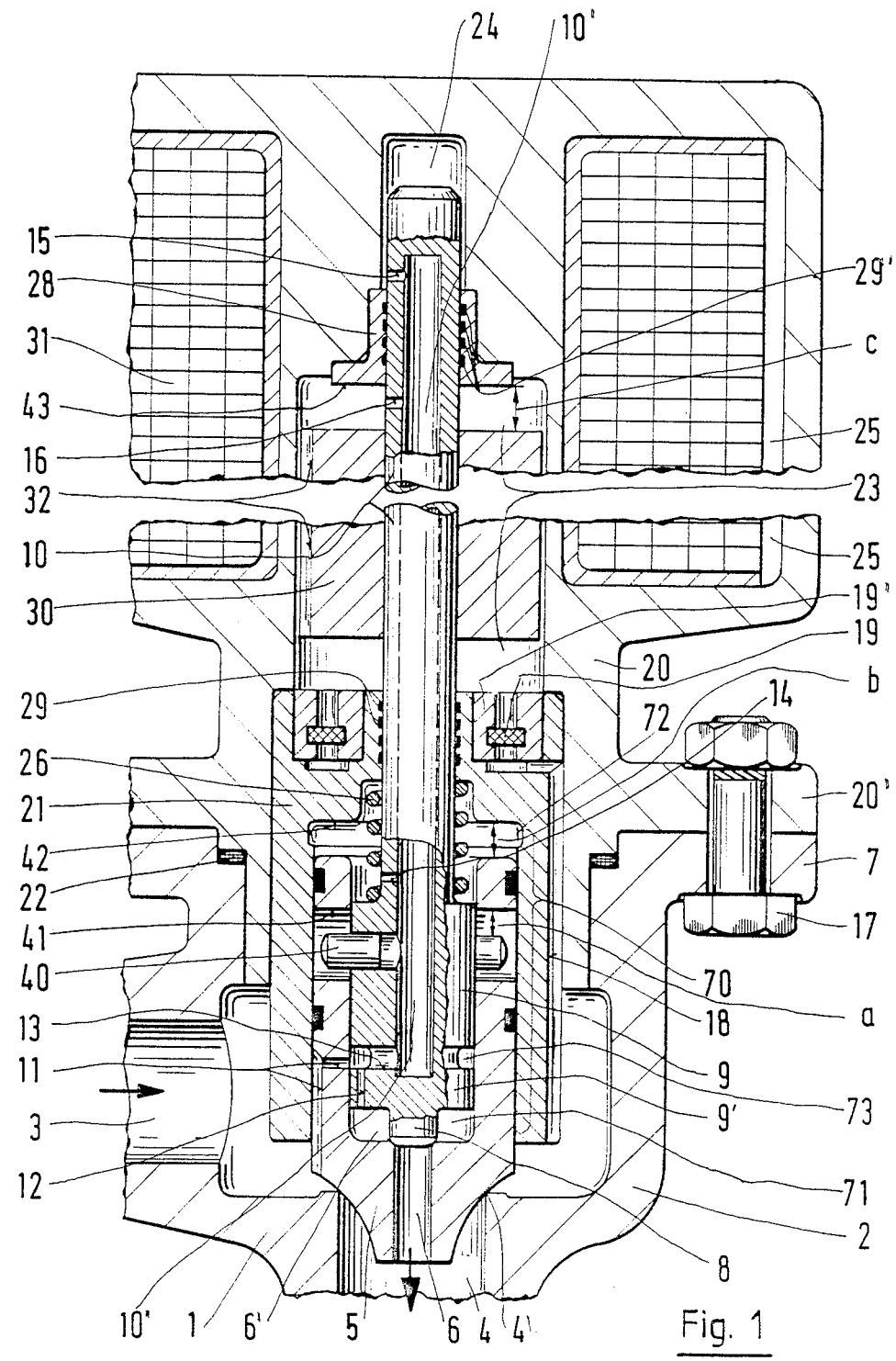
FIG. 1 is a longitudinal section through a valve according to the invention.

Referring to FIG. 1, the valve is actuatable by vapor as its own pressure medium and has a casing or body 1 receiving a first pressure chamber 2. Also, a horizontal pressure medium inlet 3 extends into the chamber 2 to supply pressure medium and a vertical pressure medium outlet 4 branches off therefrom for expelling pressure medium. In addition, the casing 1 has a valve seat 4' about the outlet 4 near the junction. A main lid 5 is movable vertically in the chamber 2 between a closed position seated on the valve seat 4' and an open position spaced therefrom. The main lid 5 has a cylindrical valve chamber 70 which can communicate by way of a passage 6 in the main lid 5 with the outlet 4.

A pilot lid 8 is disposed coaxially and movingly in the main lid 5 and is connected to a spindle 10 which has a top piston-like guide member 9 and a bottom piston-like guide member 9', the top guide member 9 being longer than the bottom guide member 9'. The guide members 9, 9' slide in the valve chamber 70 to guide the pilot lid 8 which cooperates with the second valve seat 6' disposed in the valve chamber 70 near the orifice of the passage 6. The guide members 9, 9' subdivide the valve chamber 70 into a first component chamber 71 near the passage 6, a component chamber 72 remote from the passage 6 and a communicating chamber 73 between the guide members 9, 9'.

The casing 1 has a means in the form of a cover 20 to define a substantially cylindrical second pressure chamber 23 above the valve chamber 70 and, above the chamber 23 but separate therefrom, an equalizing chamber 24 which extends around the distal end of the spindle 10. The cover 20 has a flange 20' secured by screws 17 to a casing flange 7. Disposed in the cover 20 is a guide sleeve 21 in which the main lid 5 slides while a ring seal 22 is introduoed between the flanges 20', 7.

A magnet armature 30 which is connected to the spindle 10 and which is movable together therewith is provided in the second pressure chamber 23. A magnetic winding 31 is disposed in an annular chamber 25 of the cover 20, the latter chamber being isolated from the chambers 23, 24. The winding can be connected to a d.c. supply (not shown) and operates on the normally closed basis -i.e., when current flows through the winding 31 the armature 30 is attracted and opens the pilot lid 8. A compression spring 26 is disposed between the top end face of the guide member 9 and the guide sleeve 21 to act on the pilot lid 8 in the closing direction, in just the same way as the weight of the lid 8 (i.e. under gravity).

With the pilot lid 8 closed, a bore 11 in the main lid 5 connects the first pressure chamber 2 to the communicating chamber 73, the same communicating by way of the bore 12 extending transversely through the guide member 9' with the first component chamber 71 and, by way of a transverse bore 13 in the spindle 10, with a cavity 10' which extends longitudinally and axially in the spindle 10. Also, by way of a second cross-bore 14, the cavity 10' is connected to the second component chamber 72 in all the positions of both lids 5, 8 so that the two component chambers 71, 72 are in permanent communication with one another by way of the chamber 73. The first pressure chamber 2 is in continuous communication with the second pressure chamber 23 by way of a duct 18. Filters 19 are disposed in the duct 18 near the top end of the sleeve 21 and are carried by arcuate readily replaceable filter cartridges 19' to keep dirt out of the pressure medium supplied to the second pressure chamber 23. An axial groove 32 in the armature 30 provides continuous pressure equalization in the second pressure chamber 23.

The second pressure chamber 23 is separated in sealtight manner from the valve chamber 70 by means of ring seals 29 which are disposed in the sleeve 21 and which engage the spindle 10. Similarly, the second pressure chamber 23 is separated in seal-tight manner from the equalizing chamber 24 by means of ring seals 29' carried by a collar 28 disposed between the chambers 23, 24. By way of a third cross-bore 15, the cavity 10' communicates with the equalizing chamber 24 in all the positions of the pilot lid 8. When both the main and pilot lids 5, 8 are in the closed state, a fourth cross-bore 16 in the spindle 10 provides communication between the second pressure chamber 23 and the cavity 10' (FIG. 1) and is so disposed as to be covered by the collar 28 with the pilot lid 8 fully open and the main lid 5 closed (FIG. 2) or with the pilot lid 8 slightly open and the main lid 5 fully open (FIG. 3) or with the pilot lid 8 closed and the main lid 5 fully open (FIG. 4).

The pilot lid 8 has two outwardly directed horizontal pins 40 which are coaxial of one another in the guide member 9 and which extend one each into the horizontal bore in the main lid 5. The latter bores are of larger diameter than the pins 40, the top boundary 41 of each bore being operative as a first abutment surface for the corresponding pin 40, the latter surface limiting the opening movement (stroke a) of the pilot lid 8 relative to the main lid 5. The sleeve 21 has a second abutment surface 42 which limits the opening movement (stroke b) of the main lid 5 relative to the casing 1. The bottom end face of the collar 28 is operative as a third abutment surface 43 which cooperates with the top end face of the armature 30 and thus limits the opening movement (stroke c) of the pilot lid 8 relative to the sleeve 21 and casing 1. The three abutment surfaces 41-43 are so disposed that the stroke c of the pilot lid 8 is greater than its stroke a but less than the sum of the stroke a and b.

The valve operates as follows:

In the position which is shown in FIG. 1 and which is the safety position in which the winding 31 is currentless, the main lid 5 is in engagement with the valve seat 4' and the pilot lid 8 is in engagement with the valve seat 6' so that the two lids shut off the flow of vapor from the supply inlet 3 to the outlet 4. The higher-pressure vapor in the supply inlet 3 is operative in the pressure chamber 2 and, by way of the passage 11 in the communicating chamber 73 and of the bore 12 in the first component chamber 71 and by way of the first cross-bore 13, cavity 10' and second cross-bore 14, in the second component chamber 72. The vapor is propagated through the cavity 10' and the third cross-bore 15 into the equalizing chamber 24 and through the duct 18 into the second pressure chamber 23. A further communication between the cavity 10' and the second pressure chamber 23 is provided by way of the fourth cross-bore 16. Consequently, the higher pressure, as compared with the pressure in the outlet 4, is operative everywhere upstream of the first seat 4'; the ring seal 22 obviates any pressure loss between the flanges 7 and 20'. The pilot lid 8 experiences a closing force which depends on the pressure difference between the vapor in the supply inlet 3 and the vapor in the outlet 4, the lower pressure of the vapor being operative over an area of the passage 6. Also, the compression spring 26 and the self-weight are operative as a closing force. The main lid 5 experiences a force, also in the closing direction, which depends upon the pressure difference referred to multiplied by the cross-sectional area of the outlet 4 plus the closing force of the pilot lid 8 and the self-weight thereof.

Figure 2:
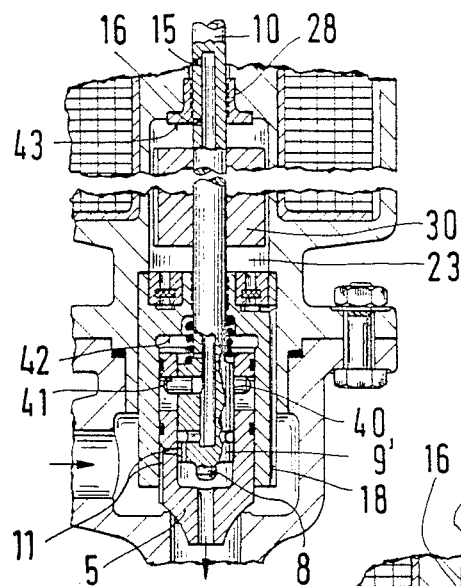
FIG. 2 is a view to a smaller scale than in FIG. 1 of the valve with the main lid closed and the pilot lid open.

When the winding 31 is connected to the d.c. supply, the armature 30 is attracted and with it the pilot lid 8, against the closing force, upwardly through the distance a until the pins 40 abut the first abutment surface 41 (FIG. 2). With the pilot lid 8 in this position, the guide member 9' covers the passage 11 in the main lid 5 and the collar 28 covers the fourth cross-bore 16. The first component chamber 71 now communicates by way of the passage 6 with the outlet line 4. By way of the passage 6, bore 12, first cross-bore 13, cavity 10', second cross-bore 14 and third cross-bore 15, the pressure in the first component chamber 71, communicating chamber 73, second component chamber 72 and equalizing chamber 24 decreases very rapidly. The pressure operative on both sides of the armature 30 in the second pressure chamber 23 is still the same as the pressure in the supply inlet 3. Consequently, the pilot lid 8 does not in all experience appreciable pressure differences, being urged upwardly merely by the magnetic force and downwardly by the force of the compression spring and by its own weight, the resulting upwardly acting force being taken up by the first abutment surface 41 of the main lid 5. The main lid 5 experiences an upwardly acting force corresponding to the pressure difference operative on the annular surface extending between the valve seat 4' and the outer diameter of the main lid 5, together with the resulting force acting upwardly on the pilot lid 8; however, the self-weight of the main lid 5 is operative downwardly.

Figure 3:
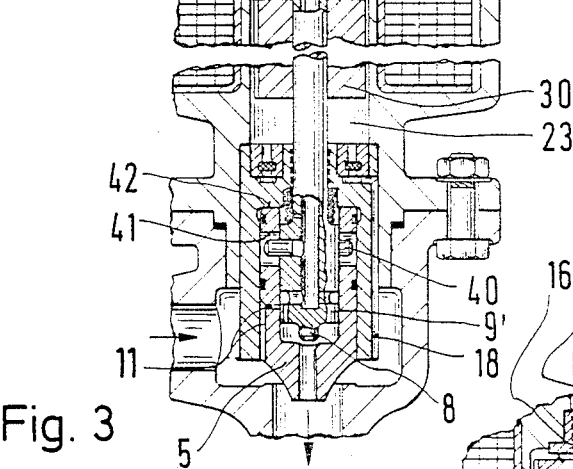
FIG. 3 is a view to a smaller scale than in FIG. 1 of the valve with both the main and pilot lids open.
Figure 4:
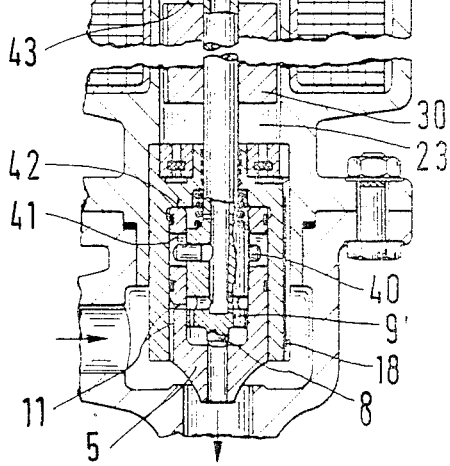
FIG. 4 is a view to a smaller scale than in FIG. 1 of the valve with the main lid open and the pilot lid closed.

Since the upward forces acting on the main lid 5 are greater than its own weight, the main lid 5 rises through the distance b until engaging with the second abutment surface 42 (FIG.3). The pilot lid 8 also rises until the armature 30 engages the third abutment surface 43. As compared with the guide sleeve 21, the pilot lid 8 has risen through the complete distance c which, as previously stated, is less than the sum of the distances or strokes a and b, so that with the main lid 5 in the open position, the pilot lid 8 is disposed very near the valve seat 6' (FIG. 3). In this position, as in the position shown in FIG. 2, the passage 11 and the fourth cross-bore 16 are still covered by the guide member 9' and collar 28, respectively.

To reclose the valve, the d.c. supply is switched off. The magnetic attraction between the winding 31 and armature 30 therefore ceases, and so the compression spring 26 and the self-weight of the pilot lid 8 move the pilot lid 8 into the closed position as shown in FIG. 4. The communication between the outlet 4 and the first component chamber 71 is therefore interrupted. Also, due to the movement of the guide member 9', the passage 11 to the communicating chamber 73 is opened, so that higher-pressure vapor flows from the pressure chamber 2 into the communicating chamber 73, the first component chamber 71, the second component chamber 72 and the equalizing chamber 24. Because of the pressure difference now present relatively to the outlet 4, the main lid 5 returns to its closed position shown in FIG. 1, its closing movement receiving a further acceleration when the fourth cross-bore 16 emerges from the collar 28 and extends into the second pressure chamber 23 so that even more higher-pressure vapor enters the cavity 10' and the chambers connected thereto.

The fact that the pressure chamber 23 and equalizing chamber 24 are pressurized separately—the chamber 23 always being pressurized with higher-pressure medium while the chamber 24 is pressurized with the medium from the valve chamber 70—is the main reason for the rapid movement of the valve. Because of this feature, there is always pressure equalization in the second pressure chamber 23, so that the appreciable resistance can build up therein to movements of the pilot lid 8. Also, since the variable-pressure zone becomes relatively small, pressures are equalized very rapidly after every change of pressure.

The very reduced travel required of the pilot lid 8 to move into its closed position on the seat 6' when the main lid 5 is open is very convenient for the valve operating on the normally closed principle since the compression spring 26 is responsible for producing most of the necessary drive. In the case of a valve operating on the normally open principle—i.e., in which the open position is the safety position—the magnetic forces acts as an additional force operative in the closing sense on the pilot lid 8.

The arrangement of the fourth cross-bore 16 in the illustrated embodiment was chosen to ensure that, when the valve closes, the bore 16 is uncovered by the collar 28 as quickly as possible so that higher-pressure steam can flow additionally from the second pressure chamber 23 into the hollow chamber 10' to expedite closing. However, in the case of a valve operating on the normally open principle, the magnetic force acts in the closing sense, as previously stated, so that consideration needs to be given in designing such a valve to provide additional assistance for the opening movement. In this case, the fourth cross-bore 16 is so arranged as to be disposed immediatelY below the collar 28 with the valve closed. Consequently, the bore 16 is covered right at the start of and opening movement of the auxiliary lid and the flow of vapor from the first pressure chamber 2 and the second pressure chamber 23 into the cavity 10' is interrupted, thus expediting the pressure decrease in the valve chamber 70 and equalizing chamber 24.

Guiding the main lid 5 in the guide sleeve 21 facilitates the fitting and dismantling of the solenoid valve. However, the main lid 5 can be guided directly on the bottom part of the casing 1.

The various bores, ducts and channels of the valve are of a size and design such that, while consideration is given to strength and production requirements, the resulting restrictive effects lead to an optimal mechanical, thermodynamic and flow behavior of the complete valve. Basically, the passages just mentioned should be as large as possible to facilitate reduced rates of the flow of the pressure medium in the valve and to facilitate rapid movements of the main and pilot lids. For the sake of simplicity, only a single bore or channel or duct is shown in the embodiment, but a number of each can be provided.

A particular advantage of the valve is the provision of a position sensor near that end of the pilot lid 8 which is remote from the valve chamber 70, such sensor indicating the position of the pilot lid 8 and of the main lid 5.

What is claimed is:

1. A valve comprising
a casing having a first pressure chamber, a pressure medium inlet for supplying a pressure medium into said pressure chamber, a pressure medium outlet for expelling pressure medium from said pressure chamber, a first valve seat about said outlet;
a main lid movably mounted in said pressure chamber between a closed position seated on said valve seat and an open position spaced from said valve seat, said lid having a valve chamber therein, at least one bore communicating said valve chamber with said pressure chamber, a passage communicating with said outlet and a second valve seat about said passage;
a pilot lid disposed in said valve chamber coaxially of said main lid for movement between a closed position seated on said second valve seat and an open position spaced from said second valve seat;
a spindle connected to said pilot lid and having two spaced apart coaxial guide members for guiding said pilot lid in said valve chamber, said guide members sub-dividing said valve chamber into a first component chamber near said outlet, a second component chamber remote from said outlet and a communicating chamber between and communicating with said component chambers, said communicating chamber being in communication with said bore in said main lid with said pilot lid in said closed position thereof and being blocked from said bore by one of said guide members with said pilot lid in said open position thereof;

housing means having an equalizing chamber receiving a distal end of said spindle and being in continuous communication with said valve chamber and a second pressure chamber between said equalizing chamber and said valve chamber and said second pressure chamber being in continuous communication with said first pressure chamber;

a magnet armature mounted on said spindle and slidably mounted in said second pressure chamber and an electromagnetic winding about said armature for moving said pilot lid;

a first abutment surface within said main lid for limiting an opening movement of said pilot lid relative to said main lid when a portion of said pilot lid abuts said first abutment surface;

a second abutment surface on said casing within said second component chamber for limiting an opening movement of said main lid relative to said casing when a portion of said main lid abuts said second abutment surface;

a third abutment surface on said housing means within said second pressure chamber for limiting an opening movement of said pilot lid relative to said casing when said armature abuts said third abutment surface wherein said abutment surfaces are disposed relative to each other so that the maximum stroke of said pilot lid relative to said casing is greater than the maximum stroke of said pilot lid relative to said main lid and less than the sum of said latter stroke and the maximum stroke of said main lid relative to said casing.

2. A valve as set forth in claim 1 wherein said spindle includes a longitudinally extending cavity between and connecting said valve chamber and said equalizing chamber.

3. A valve as set forth in claim 2 wherein said spindle includes a cross-bore communicating said cavity with said second pressure chamber with said pilot lid in said closed position thereof and being closed from said second pressure chamber at least at the maximum stroke of said pilot lid relative to said main lid.

4. A valve as set forth in claim 3 wherein said cavity is in continuous communication with said second component chamber and said communicating chamber.

5. A valve as set forth in claim 2 wherein said cavity is in continuous communication with said second component chamber and said communicating chamber.

6. A valve as set forth in claim 2 which further comprises at least one duct communicating said second pressure chamber with said first pressure chamber and a filter disposed in said duct.

7. A valve as set forth in claim 1 wherein said means is a cover mounted on said casing and which further comprises a guide sleeve secured in said cover and slidably guiding said main lid therein.

8. A valve as set forth in claim 7 wherein said cavity is in continuous communication with said second component chamber and said communicating chamber.

9. A valve as set forth in claim 7 which further comprises at least one duct communicating said second pressure chamber with said first pressure chamber and a filter disposed in said duct.

10. A valve as set forth in claim 1 which further comprises at least one duct communicating said second pressure chamber with said first pressure chamber and a filter disposed in said duct.

* * * * *